Figure 1:
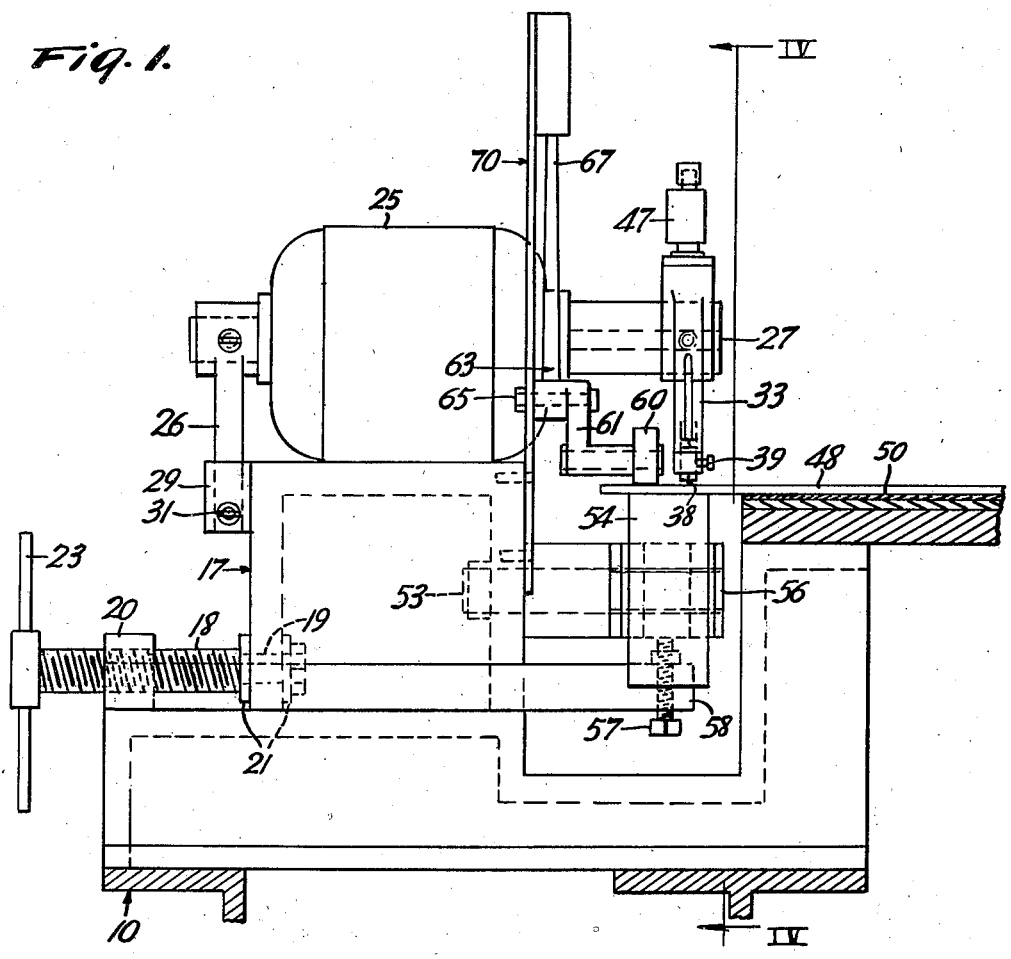

March 31, 1942.  D. R. LIMBERS  2,278,273
GLASS CUTTING APPARATUS
Filed June 19, 1941  2 Sheets-Sheet 1

INVENTOR
DON R. LIMBERS

BY Olew E. Bee
ATTORNEY.

March 31, 1942. D. R. LIMBERS 2,278,273
GLASS CUTTING APPARATUS
Filed June 19, 1941 2 Sheets-Sheet 2
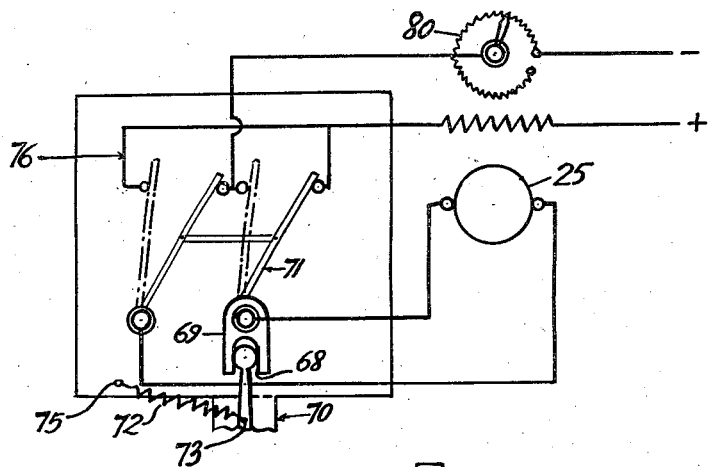
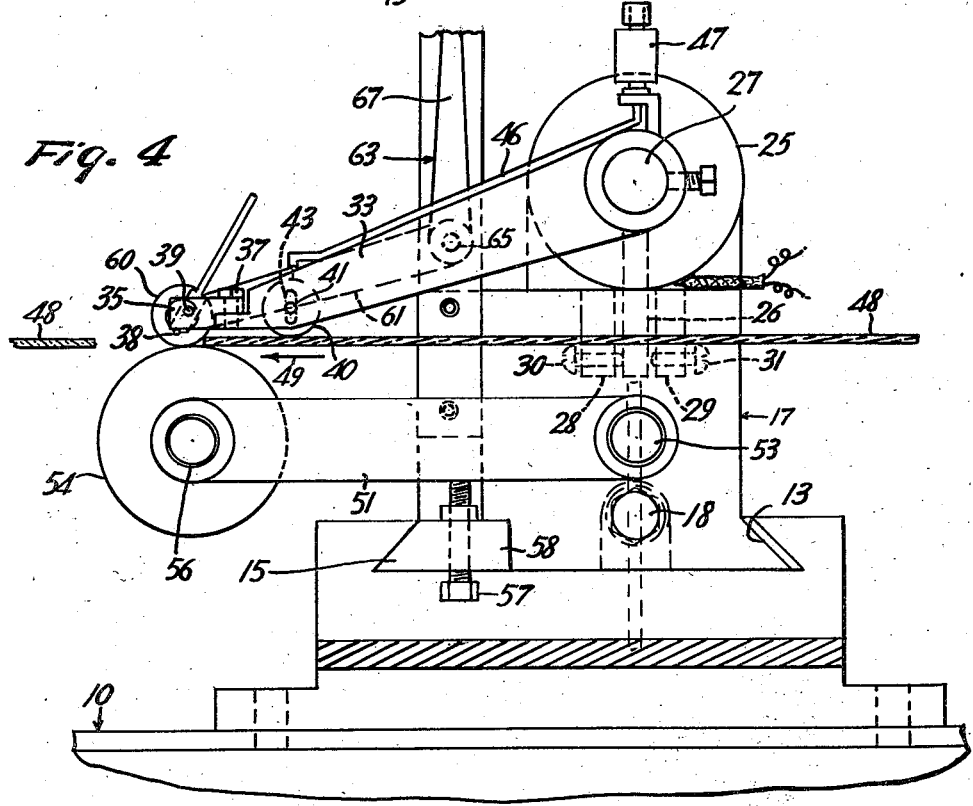
INVENTOR
DON R. LIMBERS
BY Olew E Bee
ATTORNEY.

Patented Mar. 31, 1942

2,278,273

UNITED STATES PATENT OFFICE 2,278,273

GLASS CUTTING APPARATUS

Don R. Limbers, Clarksburg, W. Va., assignor to Pittsburgh Plate Glass Company, Allegheny County, Pa., a corporation of Pennsylvania Application June 19, 1941, Serial No. 398,797

10 Claims. (Cl. 33—32)

This invention relates to so-called edge cutters for trimming marginal portions of glass sheets and it has particular relation to an electrically controlled cutter automatically operable in connection with the operation of a sheet glass handling apparatus.

One object of the invention is to provide an improved cutting apparatus providing uniform pressure of the cutting element against a glass sheet regardless of variations in thickness of the glass or of undulations therein.

Another object of the invention is to provide an improved cutting mechanism for pressing a cutter against, and withdrawing it from, sheet glass.

Another object of the invention is to provide an improved electrically operating glass cutting apparatus.

In cutting sheet glass, especially the marginal portions of glass sheets produced by a drawing process, difficulty has been experienced in securing absolute uniformity of depth of the cut. In certain instances the cutter had a tendency to skip from one high spot in the glass to another without touching the intervening space, and thus undue breakage of glass resulted. In has been customary to employ springs, solenoids, or weights to apply pressure to the cutter, but it has been found that the variations in pressure caused by the weights, or by flexing of the spring, or by the operation of solenoids according to the position of its core, materially affected the efficiency of the cutting operation.

These disadvantages are somewhat magnified in trimming marginal portions of drawn window glass because there may be more undulations and differences in thickness adjacent such marginal portions than those ordinarily encountered in cutting sheet glass which has already been produced in larger trimmed sheets. The edges of the drawn glass are trimmed off because of their irregularity and variation from plane flat surfaces.

According to this invention, an electric motor is employed to apply pressure through the cutter to the glass and the amount of pressure can be determined and applied according to the reading of a rheostat or any other similar device. Stops are provided for the motor to limit rotation of its drive shaft in either direction through a relatively small angle and in opposite directions. The electric current is supplied in such manner that the force exerted by the motor can be regulated according to the pressure at any particular value as desired, and the power of the motor tending to rotate its shaft, though it is stopped, is thus transmitted to the cutter arm on the drive shaft in response to operation of the motor. Uniform pressure is thus applied through the cutter to the glass. Devices are provided for automatically reversing the motor to lift the cutter from the glass after the cut has been made. A conventional micro switch can be employed for this purpose. In the succeeding cycle the motor is again automatically energized to set the cutter and press it upon the glass.

Figure 2:
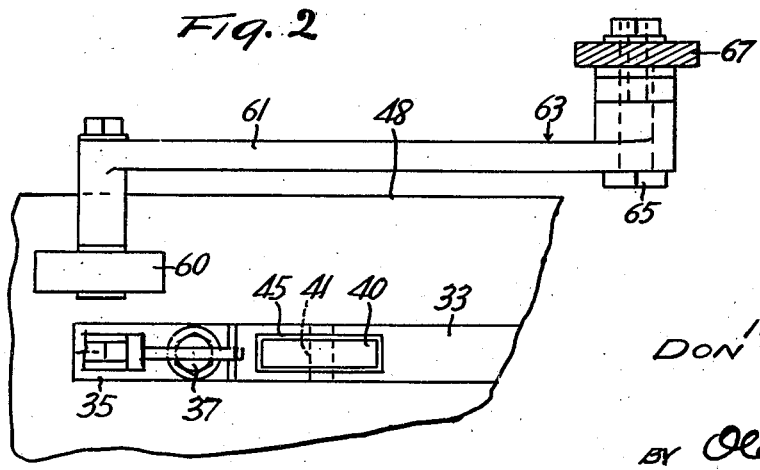

In the drawings:

Fig. 1 is a side elevation of a cutting apparatus, together with a fragmentary cross section of portions of a glass handling machine; Fig. 2 is a fragmentary plan of portions of the cutting arrangement and with certain elements shown in cross section; Fig. 3 is a wiring diagram for controlling the motor operated cutter; and Fig. 4 is a fragmentary elevation at right angles to the elevation of Fig. 1, together with a fragmentary vertical section of portions of the machine taken substantially along the line IV—IV of Fig. 1.

In practicing the invention a cutter frame 10 of a glass handling machine is provided with horizontal guides 13 in which flanges 15 of a horizontally adjustable carriage 17 are movable. An adjustable screw shaft 18 has one end rotatably mounted, as indicated at 19 in a wall of the carriage 17, and is screw threaded through an ear 20 rigidly formed on the machine frame. Collars 21 secured about the shaft 18 on opposite sides of the carriage frame prevent axial movement of the shaft in the carriage, and a suitable handle 23 is provided on the outer end of the shaft for rotating it in adjusting the carriage.

A reversing electric motor 25 rigidly mounted upon the carriage 17 has a rigid arm 26 extending at right angles from the motor drive shaft 27. A pair of spaced ears 28 and 29 are rigidly mounted upon the carriage to receive the arm 26 therebetween and oppositely disposed bolts 30 and 31 are adjustable axially toward and away from each other through the ears 28 and 29, respectively. These bolts serve as adjustable stops between which the arm 26 operates and determine the angle through which the motor shaft is rotatable.

A cutter arm 33 is also rigidly secured to the motor shaft 27 and is provided at its end with a block 35 that is swingable about a vertical axis defined by a bolt 37 which clamps the block to the body of the arm 33. A cutter 38 is mounted in the block and it can be adjustable therein by means of a set screw or bolt 39 threaded horizontally into the block and against the cutter. A felt roller 40 is carried upon a pin 41 which is mounted in floating relation in vertical slots 43 formed in the arm 33 to provide material vertical play for the roller. An intermediate part of the arm 33 is recessed, as indicated at 45 (Fig. 2), to receive the roller. A suitable oil reservoir 47 is mounted upon the arm 33 and a small tube 46 extends from the reservoir to a position immediately above the roller 40 to supply oil thereto.

Sheet glass is movable in the direction of the arrow 49 (Fig. 4) upon a conveyor 50 (Fig. 1) which forms a part of the glass handling machine, and a marginal portion of the glass extends beyond, or overhangs the edge of the conveyor to pass underneath the cutter 38. An arm 51 that has a pivotal connection 53 securing one of its ends to the carriage also has a roller 54 journalled, as indicated at 56, in its outer end and this roller is adapted to engage the lower side of the glass as the latter is moved by the conveyor. An adjustable bolt 57 is screw threaded through an extension 58 of one of the flanges 15 of the carriage and an intermediate portion of the arm 51 rests upon the upper end of the bolt which can be adjusted to gauge the roller 54 properly for engaging the lower side of the sheet glass in proper supporting relation directly underneath the cutter. The roller 54 is sufficiently wide to provide portions directly below both the cutter 38 and the roller 60.

As the sheet glass 48 is advanced in the direction indicated by the arrow 49, its front edge strikes a roller 60 journalled upon the outer end of a lower arm 61 of a bell crank 63 which has its intermediate portion pivotally mounted as indicated at 65, upon the carriage 17. An upper arm 67 of the bell crank has its upper end portion disposed in a slotted end portion 68 of a switch operating arm 69 that is pivoted upon an upright support 70 mounted upon the carriage. A reversing switch 71 which is carried by the arm 69 is operable by the bell crank. The switch 71 is included in an electric circuit as illustrated in the diagram 76 (Fig. 3). As the leading edge of the glass 48 strikes and raises the roller 60, the switch is thus actuated and the motor 25 is reversed to apply rotative force to the shaft 27 in a counterclockwise direction (Fig. 3). In response to this action, the cutter 38 is pressed upon the glass adjacent its edge which is then confined between the cutter and the roller 54. The latter roller serves as a counter-support for the glass. The felt oiling roller 40 provides a lubricated path over which the cutter passes during the cutting operation and this roller remains in contact with the glass in both the raised and lowered position of the arm 33.

When the roller 60 drops from the trailing edge of the glass sheet, a spring 72 which tends always to rotate the bell crank about its pivotal connection 65 in a counterclockwise direction (Fig. 3), automatically actuates the switch 71 to its former position and again reverses operation of the motor. The spring has a connection 73 at one end to secure it to the bell crank arm 67, and at its other end it has a connection 75 securing it to the support 70. In the reversing action last referred to, the motor exerts force tending to rotate the motor shaft 27 in a clockwise direction (Fig. 4) and thereby lifts the cutter arm 33 to such position as to hold the cutter free from and above the path of movement of the glass. In this position the stop 30 positively resists the force of the motor through the arm 26.

A rheostat 80 is included in the electric circuit, as shown in Fig. 3, to regulate the degree of pressure to be applied by the cutter 38 as it passes across the glass. When the proper pressure is once determined, the motor always applies such pressure without variation regardless of the position of the cutter arm 33 in its pivotal action and also regardless of the irregularities of undulations or differences in thickness in the glass.

In order to set the cutter in its proper operative position, the bolt 37 is first loosened so as to permit the block to align itself with the direction of movement of the glass as a preliminary operation of the apparatus. Then the bolt is tightened and the apparatus is thus in condition for normal operation.

Although only one form of the invention has been shown and described in detail, it will be apparent to those skilled in the art that the invention is not so limited, but that various changes can be made therein without departing from the spirit of the invention or from the scope of the appended claims.

I claim:

1. In a glass cutting apparatus including means for conveying sheet glass along a predetermined path, a reversing electric motor having a drive shaft, a crank arm on the shaft, a cutter on the arm movable toward and away from the path of movement of the glass conveying means in response to operation of the motor, and motor reversing means for automatically actuating the cutter into and out of cutting position.

2. In a glass cutting apparatus, an electric motor having a drive shaft, a support for sheet glass, a cutter connected to the drive shaft and responsive to electric power generated by the motor to press the cutter against the glass, and means for relatively moving the cutter and support while the cutter is pressed by the motor upon the glass.

3. In a glass cutting apparatus, an electric motor having a drive shaft, a support for sheet glass, a cutter connected to the drive shaft and responsive to electric power generated by the motor to press the cutter against the glass, means for relatively moving the cutter and support while the cutter is pressed by the motor against the glass, and means for regulating the pressure exerted through the cutter upon the glass.

4. In a glass cutting apparatus, an electric motor having a drive shaft, a support for sheet glass, a cutter connected to the drive shaft and responsive to electric power generated by the motor to press the cutter against the glass, means for relatively removing the cutter and support while the cutter is pressed by the motor upon the glass, and control means actuated by the glass on the support in response to relative movement of the cutter and support to initiate the pressure of the cutter against the glass.

5. In a glass cutting apparatus, an electric motor having a drive shaft, a support for sheet glass, a cutter connected to the drive shaft and responsive to electric power generated by the motor to press the cutter against the glass, and means for relatively moving the cutter and support while the cutter is pressed by the motor upon the glass, and motor reversing control means actuatable by the glass in the support in response to relative movement of the cutter and support to initiate the pressure of the cutter to cutting position against the glass and to withdraw the cutter from cutting position.

6. In a glass cutting apparatus, an electric reversing motor having a drive shaft, a support for sheet glass, a cutter connected to the drive shaft and responsive to electric power generated by the motor in one direction of rotation of the drive shaft to press the cutter against the glass, means for relatively moving the cutting and support while the cutter is pressed against the glass, and a rheostat connected to the motor for regulating the pressure exerted through the cutter against the glass.

7. In a glass cutting apparatus, an electric reversing motor having a drive shaft, stops associated with the drive shaft and limiting rotation of the latter through a predetermined angle, a support for sheet glass, a cutter connected to the drive shaft and responsive to electric power generated by the motor in one direction of rotation of the drive shaft to press the cutter against the glass, means for relatively moving the cutter and support while the cutter is pressed against the glass, and a rheostat connected to the motor for regulating the pressure exerted through the cutter against the glass.

8. A glass cutting apparatus comprising an electric motor adapted to generate constant power, a drive shaft included in said motor for transmitting the power, and a cutter carried by said shaft and responsive to the driving power of the motor to exert constant pressure on work to be cut.

9. A glass cutting apparatus comprising a reversing electric motor adapted to generate constant power, a drive shaft included in said motor for transmitting the constant power, stops associated with the shaft and limiting rotation thereof in opposite directions through a predetermined angle, and a cutter carried by said shaft and responsive to driving power of the motor to exert constant pressure on work to be cut.

10. A glass cutting apparatus comprising an electric motor adapted to generate constant power, a drive shaft included in said motor for transmitting the constant power, a cutter carried by said shaft and responsive to the driving power of the motor to exert constant pressure on work to be cut, and electric means for changing the degree of power exerted by the motor and maintaining such power at any of various values.

DON R. LIMBERS.